Patented June 20, 1939

2,162,721

UNITED STATES PATENT OFFICE 2,162,721

PRODUCTION OF D-RIBOSE FROM CALCIUM D-ALTRONATE

Claude S. Hudson, Washington, D. C., and Nelson K. Richtmyer, Greene County, N. Y., assignors to the Government of the United States, as represented by the Secretary of the Treasury No Drawing. Application August 19, 1938, Serial No. 225,806

2 Claims. (Cl. 260—209)

(Granted under the act of March 3, 1883, as amended April 30, 1928; 370 O. G. 757)

This invention relates to the preparation of d-ribose and has for its object the provision of a method for preparing it from calcium d-altronate, a substance which has not been used before for this purpose, and which by this invention is made a new source for the preparation of d-ribose.

We have discovered that the method of degrading ordinary hexoses to pentoses (frequently, with poor yields) first described by Ruff (Berichte der deutschen chemischen Gesellschaft, 1898, vol. 31 page 1573), and later improved by Hockett and Hudson (Journal of the American Chemical Society, 1934, vol. 56, page 1632), which consists in the oxidation of a salt of a hexonic acid by hydrogen peroxide in the presence of ferric acetate as a catalyst, permits the production in good yield of d-ribose from calcium d-altronate; although from the unique character of d-altrose as compared with other aldoses—see J. Am. Chem. Soc. v. 57, p. 1716 (1935); v. 48, p. 1981 (1926); v. 58, p. 2534 (1938)—this would not be expected. d-ribose is of value in biological, biochemical and medical fields.

The following is an example of a typical experiment by which calcium d-altronate has been converted to d-ribose. To 90 cc. of distilled water in a 250 cc. beaker was added 10 cc. of aqueous barium acetate solution (containing 7.9% $(CH_3COO)_2Ba.H_2O$), 10 cc. of aqueous ferrous sulfate solution (containing 8.0% $FeSO_4.7H_2O$), and 10 g. of crystalline calcium d-altronate ($C_{12}H_{22}O_{14}Ca.3.5\ H_2O$). The mixture was stirred, heated to boiling, allowed to settle, and the barium sulfate removed by filtration through a Buchner funnel precoated with filtercel. The precipitate was washed with 75 cc. of water, and the filtrate rinsed into a 400 cc. beaker and cooled to 35° C. A 6 cc. portion of 30% hydrogen peroxide was added, causing the formation of ferric acetate, the oxidation of the calcium d-altronate with evolution of carbon dioxide, and a rise in temperature to 47° C. When the hydrogen peroxide had been consumed the solution turned from pale yellow to dark purple. The solution was cooled to 40° C., a second 6 cc. portion of 30% hydrogen peroxide added, and the mixture left overnight. The dark turbid solution was filtered through activated carbon and evaporated in vacuo to a thick syrup; the residue was extracted, in portions, with a total of 100 cc. of hot methyl alcohol. This extract was filtered, cooled, and diluted with an equal volume of ether; the precipitated salts were removed by filtration, and the mother-liquor concentrated in vacuo to a thick syrup. This syrup was dissolved in 10 cc. of absolute ethyl alcohol, concentrated in vacuo, and the process twice repeated to remove water. The resulting syrup was dissolved in 20 cc. of absolute ethyl alcohol, diluted with ether to precipitate additional small amounts of calcium salts, and the filtered solution concentrated in vacuo to a small volume of colorless syrup, which crystalized completely when inoculated with an authentic sample of d-ribose.

The invention described herein may be practiced and used by or for the Government of the United States for governmental purposes without payment of any royalty thereon.

We claim as our invention:

1. The process of converting calcium d-altronate to d-ribose by boiling together in aqueous solution barium acetate, ferrous sulphate and calcium d-altronate, removing the filtrate from the barium sulfate precipitate, oxidizing the filtrate with hydrogen peroxide, and extracting the d-ribose from the oxidized filtrate.

2. The process of converting calcium d-altronate to d-ribose, by oxidizing the calcium d-altronate in the presence of ferric acetate as a catalyst.

CLAUDE S. HUDSON.
NELSON K. RICHTMYER.